(12) United States Patent
Terasawa

(10) Patent No.: US 7,554,579 B2
(45) Date of Patent: Jun. 30, 2009

(54) IMAGE PICKUP APPARATUS STORING CONTROL OPERATION FILE ON REMOVABLE RECORDING MEDIUM

(75) Inventor: Ken Terasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 744 days.

(21) Appl. No.: 10/873,885

(22) Filed: Jun. 22, 2004

(65) Prior Publication Data

US 2005/0007465 A1    Jan. 13, 2005

(30) Foreign Application Priority Data

Jul. 10, 2003    (JP) .............................. 2003-194941

(51) Int. Cl.
*H04N 5/76*    (2006.01)
*G03B 17/24*    (2006.01)

(52) U.S. Cl. .................. 348/231.6; 348/231.7; 396/321

(58) Field of Classification Search .............. 348/231.6, 348/231.7, 231.8, 231.2, 231.3, 231.99; 396/297, 396/300, 321
See application file for complete search history.

(56) References Cited

U.S. PATENT DOCUMENTS

| | | | | |
|---|---|---|---|---|
| 5,477,264 A * | 12/1995 | Sarbadhikari et al. | .... | 348/231.6 |
| 5,635,983 A * | 6/1997 | Ohmori | .................... | 348/231.6 |
| 5,845,044 A * | 12/1998 | Iizuka et al. | ............. | 348/231.6 |
| 6,006,039 A * | 12/1999 | Steinberg et al. | ............ | 396/300 |
| 6,104,430 A * | 8/2000 | Fukuoka | .................. | 348/231.6 |
| 6,134,606 A * | 10/2000 | Anderson et al. | ........... | 396/297 |
| 6,177,957 B1 * | 1/2001 | Anderson | ............... | 348/231.99 |
| 6,829,009 B2 | 12/2004 | Sugimoto | | |
| 6,833,867 B1 * | 12/2004 | Anderson | ................ | 348/231.3 |
| 6,900,835 B2 * | 5/2005 | Cazier et al. | ............. | 348/231.2 |
| 6,989,861 B2 * | 1/2006 | Schinner | .................. | 348/231.6 |
| 7,019,778 B1 * | 3/2006 | Prabhu et al. | ............ | 348/207.1 |
| 2002/0054224 A1 * | 5/2002 | Wasula et al. | ............... | 348/232 |
| 2003/0210331 A1 * | 11/2003 | Battles et al. | ............ | 348/207.1 |
| 2004/0218065 A1 * | 11/2004 | Schinner | .................. | 348/231.6 |
| 2006/0017694 A1 * | 1/2006 | Shikata | ........................ | 345/158 |
| 2006/0238625 A1 * | 10/2006 | Sasaki et al. | ............. | 348/231.3 |
| 2008/0284856 A1 * | 11/2008 | Okazaki | ................ | 348/207.99 |

FOREIGN PATENT DOCUMENTS

| | | | |
|---|---|---|---|
| EP | 1058450 A1 | | 12/2000 |
| EP | 1152589 A2 | * | 11/2001 |
| JP | 04213280 A | * | 8/1992 |
| JP | 09-130731 | | 5/1997 |
| JP | 2002-262152 | | 9/2002 |

* cited by examiner

*Primary Examiner*—John M Villecco
(74) *Attorney, Agent, or Firm*—Canon USA Inc IP Div

(57) ABSTRACT

An image pickup apparatus includes a monitor for displaying a menu screen, a menu button for operating a menu on the menu screen, a hardware key such as a button for setting a picture-taking condition, and a storage medium removably mounted in a body of the image pickup apparatus for storing picture data. The image pickup apparatus stores in the storage medium an operation control file in which information on contents of actions associated with operation of the menu button or the hardware key is stored. Further, the image pickup apparatus reads the operation control file stored in the storage medium and changes the actions associated with operation of the menu button or the hardware key according to information stored in the operation control file.

6 Claims, 22 Drawing Sheets

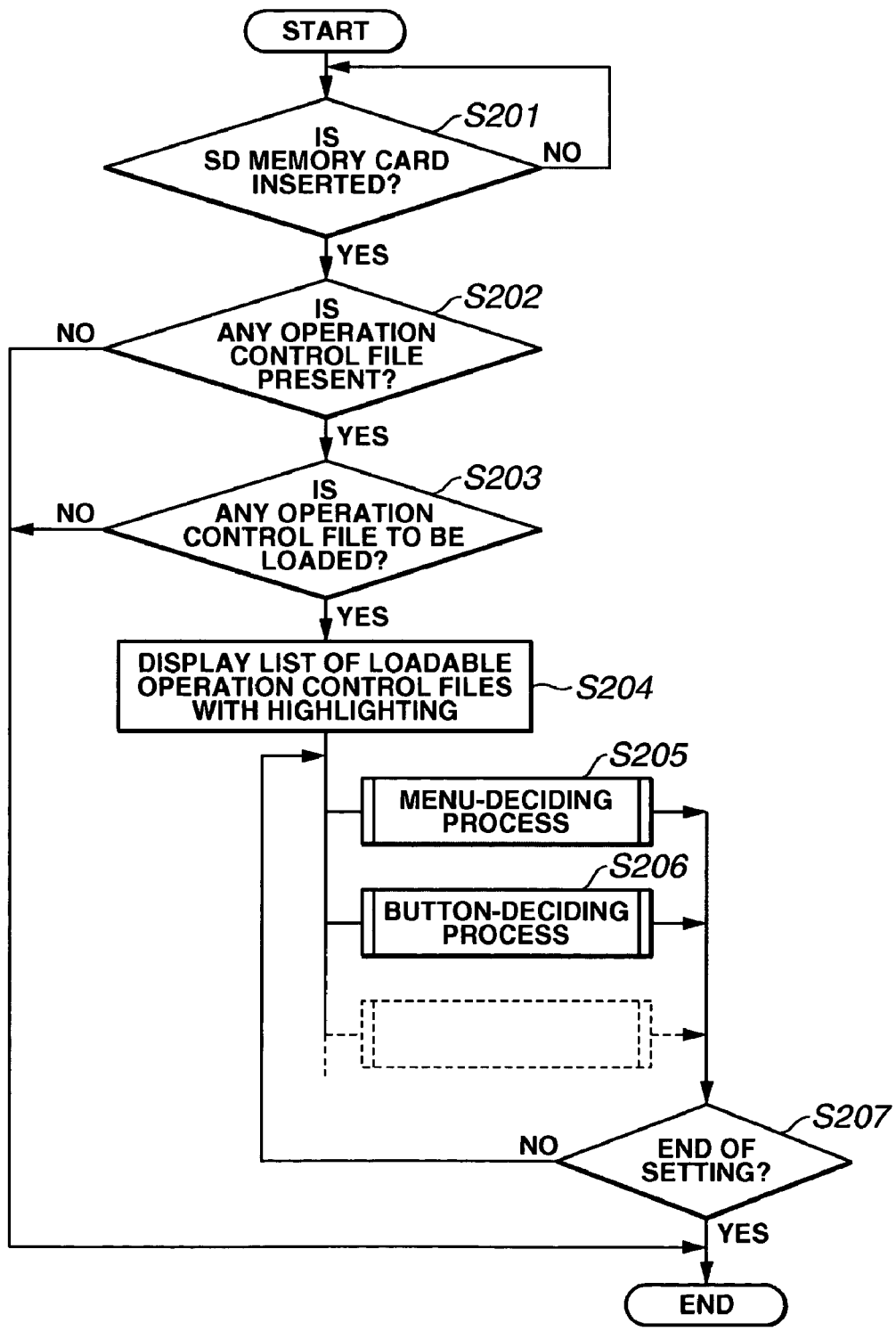

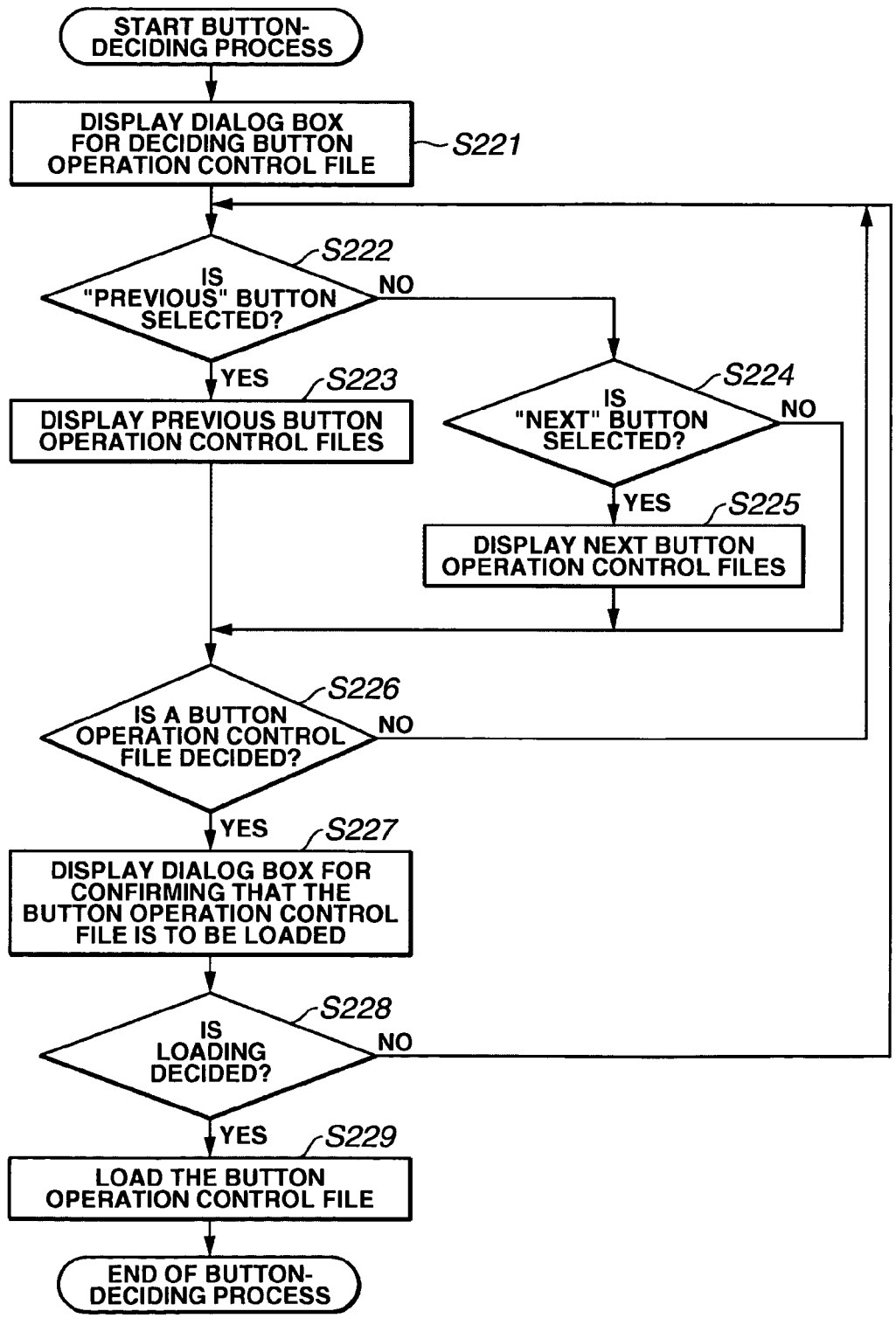

CARD MIX EFFECTS
CAMERA SETTING
VTR SETTING
DISPLAY SETTING
SYSTEM SETTING
BACK

CAMERA SETTING
SHUTTER
DIGITAL ZOOM
IMAGE STABILIZATION
16:9
WHITE BALANCE
AF AUXILIARY LIGHT
BACK

WHITE BALANCE
AUTO
SETTING
INDOOR
OUTDOOR

FIG.13

SETTING OF WHITE BALANCE
CARD MIX EFFECTS
CAMERA SETTING
VTR SETTING
DISPLAY SETTING
SYSTEM SETTING
BACK

FIG.23

CURRENT OPERATION CONTROL FILE IS A LOADED ONE. DO YOU WANT TO RETURN SETTING TO A STANDARD ONE BY DISCARDING CURRENT OPERATION CONTROL FILE?

YES   NO

IMAGE PICKUP APPARATUS STORING CONTROL OPERATION FILE ON REMOVABLE RECORDING MEDIUM

BACKGROUND OF THE INVENTION

1. Field of the Invention

The present invention relates to image pickup apparatuses, such as a digital still camera and a camera-integrated digital video recorder (camcorder).

2. Description of Related Art

Most modern electronic cameras, such as a digital still camera and a camera-integrated digital video recorder, have a menu function, which allows a user to select a picture-taking condition or the like, and a hardware structure such as an operation key.

However, in order for the user to adjust the camera setting to his or her favorite picture-taking condition via a predetermined menu and to take a desired video picture, the user must search for a desired setting item from the menu structure having a deep hierarchy. Searching for the desired setting item can be very troublesome for the user.

Users desire household electronic cameras that are light-weight and small. Therefore, only a very small number of hardware operation elements, such as buttons, dials and cross keys, are provided on such electronic cameras. In order to realize selection of various functions, a menu function having a deep, hierarchical menu structure is essential. This is, however, not advantageous in terms of user operationality.

In addition, in most electronic still cameras, each hardware operation key is provided for selectively setting a number of functions, or a desired setting can be performed by repeatedly operating only a particular operation key. Such a configuration of the operation key lends itself to a reduction in size, but causes user confusion because the user cannot directly perform an intended operation.

Japanese Laid-Open Patent Application No. 2002-084447 proposes a menu item that is changeable according to a user's usage.

The order for displaying menu items is changed according to user setting or frequency of usage. However, this technique is intended, in some regards, for users having a good knowledge of operation. Thus, only users who have sufficient knowledge for setting and are able to cope with any automatic change of setting are targets. Accordingly, this technique is not ideal for all users. In other words, most users including beginners cannot obtain desired operationality.

SUMMARY OF THE INVENTION

The present invention is directed to an image pickup apparatus having improved user operationality.

The present invention is also directed to an image pickup apparatus having a menu structure which can be operated even by a beginner user easily with his or her favorite operationality.

In one aspect of the present invention, the image pickup apparatus using a removable recording medium includes, a reader operable to detect and read an operation control file stored on the removable recording medium, a display, an operation button operable to set a picture-taking condition, and a controller controlling the reader to detect and read the operation control file stored on the removable recording medium and applying the read operation control file on at least one of the display and the operation button.

In another aspect of the present invention, the image pickup apparatus includes a recorder operable to record files on the removable recording medium, a display operable to display a menu of picture-taking condition settings, an operation button having a configuration to set a picture-taking condition, and a controller selectively controlling the recorder to record on the removable recording medium an operation control file corresponding to at least one of the menu of picture-taking condition settings and the configuration of the operation button.

In a further aspect of the present invention, the image pickup apparatus includes a reader operable to detect and read an operation control file stored on the removable recording medium, a recorder operable to record files on the removable recording medium, a display operable to display a menu of picture-taking condition settings, an operation button having a configuration to set a picture-taking condition, and a controller selectively controlling the reader and the recorder.

The above features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2A is a flow chart illustrating an entire process performed when an operation control file is loaded.

FIG. 2C is a flow chart illustrating a process performed when a button operation control file is selected.

FIG. 13 is a diagram showing a display screen indicating an exemplary menu to which an operation control file is applied in a process for setting white balance.

FIG. 23 is a diagram showing an exemplary dialog box for inquiring about saving of an operation control file.

DETAILED DESCRIPTION OF THE EMBODIMENTS

Embodiments of the invention will be described in detail below with reference to the drawings.

First Embodiment

Figure 1:
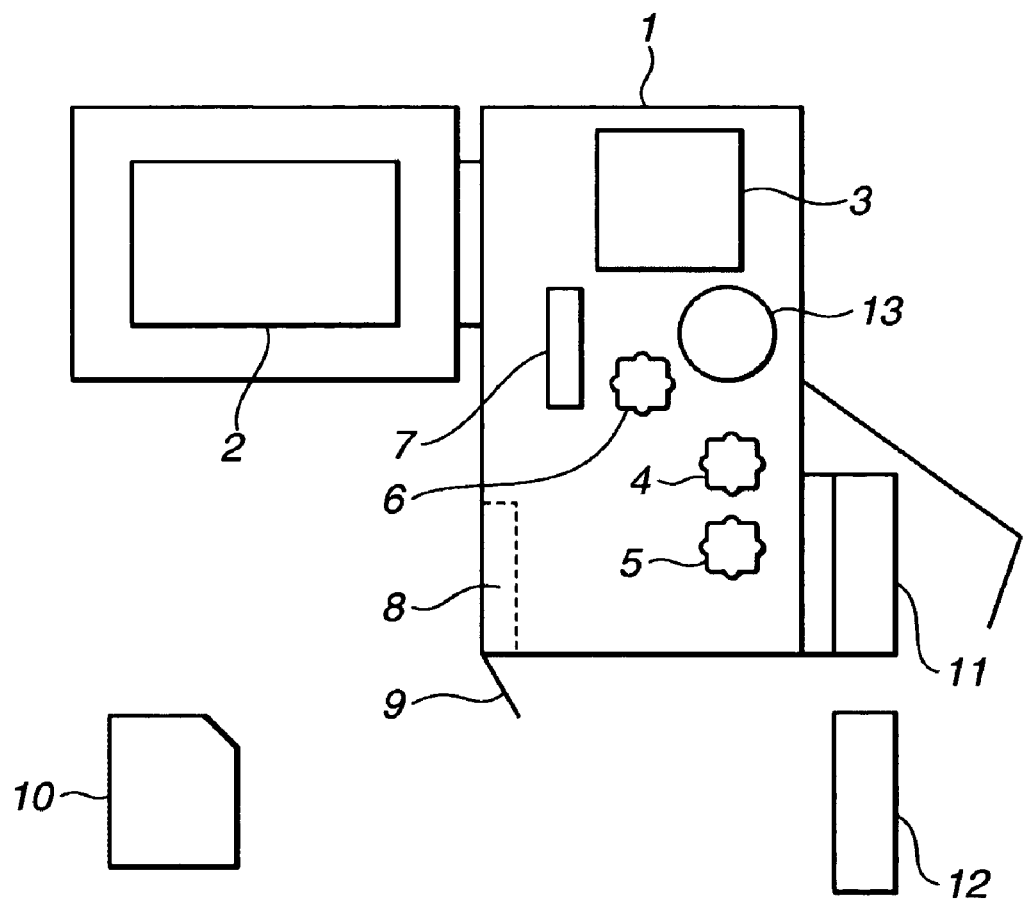
FIG. 1 is a schematic diagram showing the construction of an image pickup apparatus according to an embodiment of the invention.

FIG. 1 is a schematic diagram of an image pickup apparatus 1 according to a first embodiment of the present invention. The image pickup apparatus 1 can be a camera-integrated picture recording and reproducing apparatus, also known as a digital video camera or a digital still camera.

The image pickup apparatus, i.e., the digital video camera (hereinafter referred to as "DVC") 1, has a liquid crystal display panel 2 and an electronic viewfinder 3, which serve as display portions for displaying a taken picture or a reproduced picture, a menu, and an operating state obtained when an operation button is operated.

The DVC 1 further includes a hardware button 4, a hardware button 5, a menu button 6, a rotary dial 7, a slot 8, a slot cover 9, a mechanical deck 11 and a trigger button 13. The hardware buttons 4 and 5 are operable for setting particular picture-taking conditions, such as manual focusing and manual exposure, respectively. The menu button 6 is operable for causing a menu screen to be displayed on the liquid crystal display panel 2 and the electronic viewfinder 3 for the purpose of setting a picture-taking condition. The rotary dial 7 is operable for selecting a setting item on the menu screen. The slot 8 is configured to receive a removable recording medium, such as an SD (Secure Digital) memory card 10. The slot cover 9 has a detecting device for detecting mounting/demounting of the removable recording medium 10 into/from the slot 8. The mechanical deck 11 is configured to receive another removable recording medium, such as a cassette tape (hereinafter referred to as the "DV cassette") 12. The trigger button 13 is operable for starting and stopping picture-taking. The manual-focusing button 4, the exposure-control button 5, the menu button 6 and the trigger button 13 are hereinafter collectively referred to as the "operation buttons".

The DV cassette 12 can record, for example, moving picture data that has been compressed and encoded according to a DV (digital video) format for displaying a video picture on household televisions, such as NTSC and PAL. The SD memory card 10 can record, for example, still picture data in the JPEG format or stream data in the MPEG-1, MPEG-2, MPEG-4 or Motion-JPEG formats.

Further, the SD memory card 10 can store in a predetermined directory, for example, one or more operation control files having a user's favorite picture-taking operation control program. When the SD memory card 10 is inserted into the DVC 1, the liquid crystal display panel 2 or the electronic viewfinder 3 displays a message inquiring whether to apply the operation control file stored in the SD memory card 10. If the user decides to apply the operation control file, the DVC 1 includes a system controller, such as one or more microcomputers (not shown), performs an operation control process.

Additionally, the liquid crystal display panel 2 or the electronic viewfinder 3 displays a menu screen regarding an operation control process in the following manner.

Figure 12A:
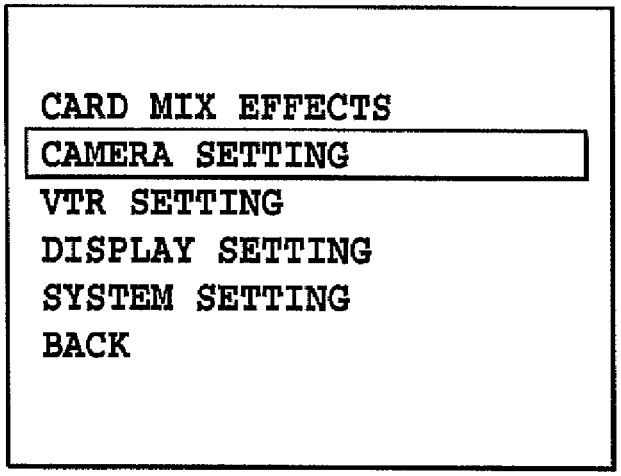
FIG. 12A is a diagram showing a display screen indicating the first hierarchy of an exemplary standard menu in a process for setting white balance.
Figure 12B:
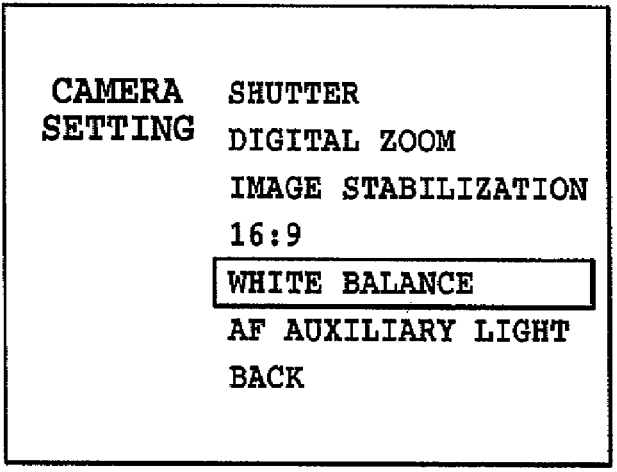
FIG. 12B is a diagram showing a display screen indicating the second hierarchy of the exemplary standard menu in the process for setting white balance.
Figure 12C:
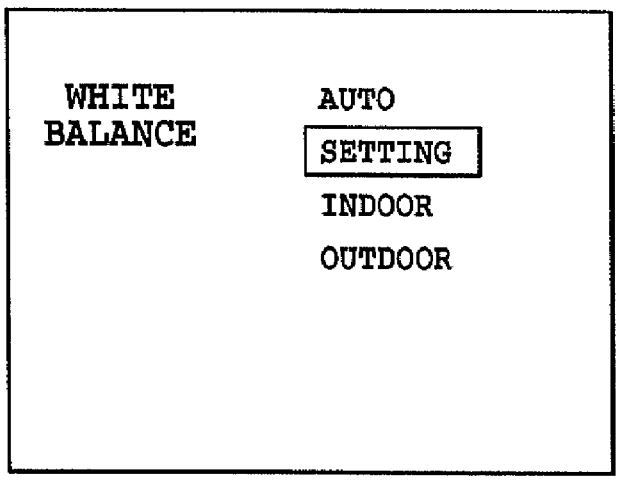
FIG. 12C is a diagram showing a display screen indicating the third hierarchy of the exemplary standard menu in the process for setting white balance.

FIGS. 12A-C are diagrams showing display screens indicating first, second and third hierarchies, respectively, of an exemplary standard menu in a process for setting white balance. In the case of using a standard menu to select "SETTING OF WHITE BALANCE," which is a setting item frequently used by the user, a user first selects "CAMERA SETTING" in the first hierarchy (FIG. 12A) of the menu, then selects "WHITE BALANCE" in the second hierarchy (FIG. 12B), and then selects "SETTING" in the third hierarchy (FIG. 12C), for example.

FIG. 13 is a diagram showing a display screen indicating an exemplary menu to which an operation control file is applied in a process for setting white balance. On the other hand, in the case of using a menu in which an operation control file is applied, "SETTING OF WHITE BALANCE" can be displayed in the first hierarchy of the menu since the operation control file is predefined so as to cause "SETTING OF WHITE BALANCE" to be displayed in the first hierarchy of the menu.

Alternatively, for example, in cases where an operation control file is predefined so as to cause "SETTING OF WHITE BALANCE" to be performed in response to operation of the manual-focusing button 4, "SETTING OF WHITE BALANCE" can be performed by operation of the manual-focusing button 4 since the operation control file is applied to the DVC 1.

A structural arrangement of an operation control file stored in the SD memory card 10, which can be defined by the user, and a process for applying the operation control file to the DVC 1 are described below.

Figure 3:
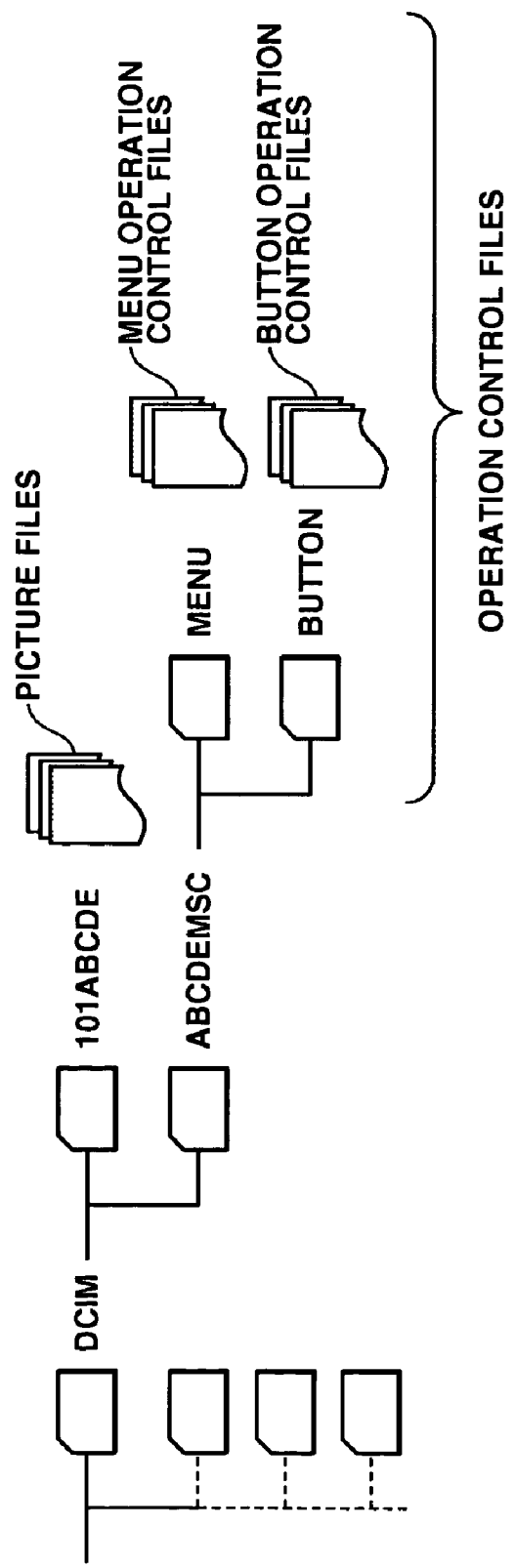
FIG. 3 is a diagram illustrating a directory structure stored in an SD (Secure Digital) memory card.

FIG. 3 is a diagram illustrating a directory structure stored in the SD memory card 10. In the SD memory card 10, an operation control file, which includes a menu operation control file and a button operation control file, is stored together with picture files in a storage manner compliant with a predetermined file format.

Figure 2B:
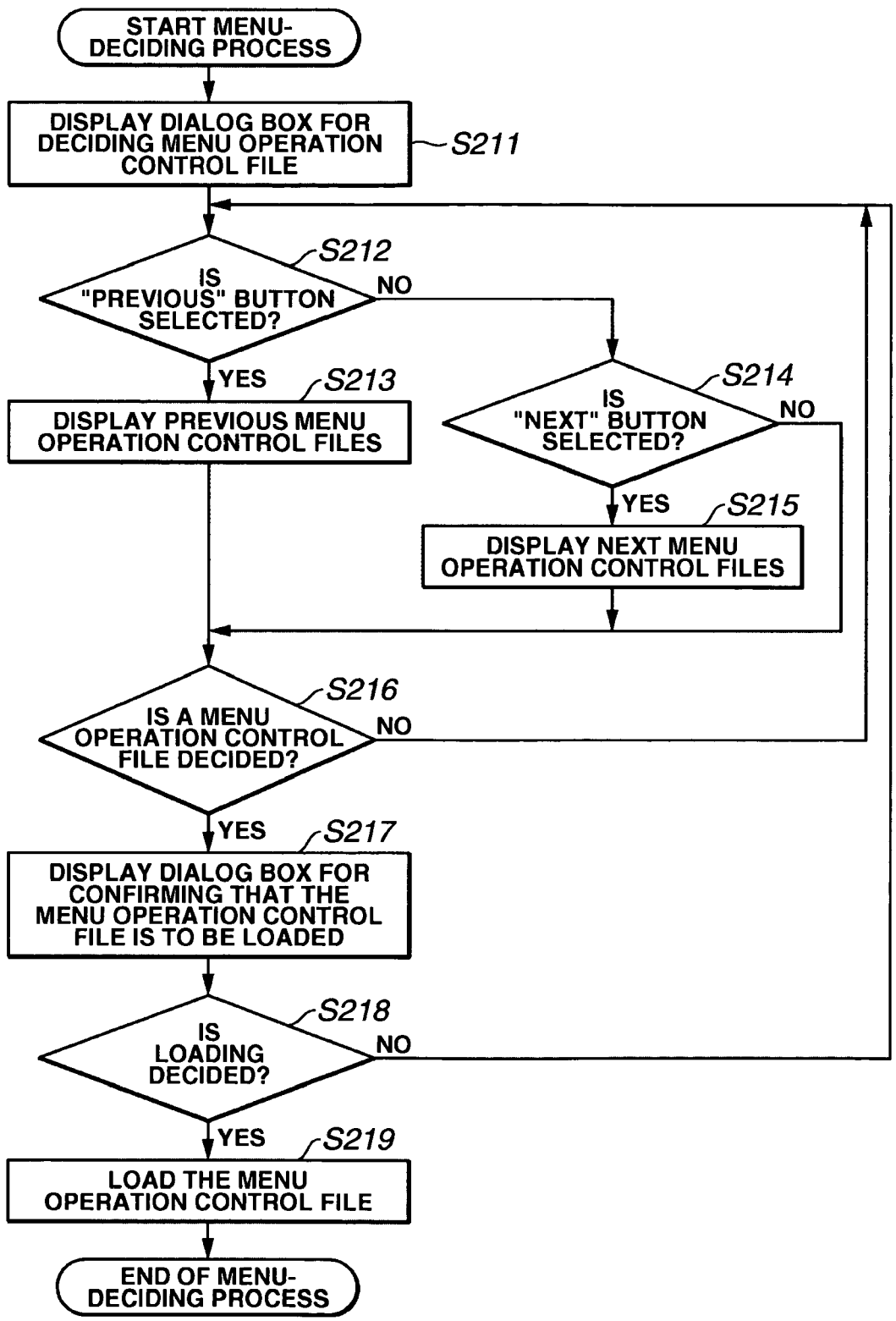
FIG. 2B is a flow chart illustrating a process performed when a menu operation control file is selected.

FIGS. 2A, 2B and 2C are flow charts illustrating a process performed when an operation control file is applied. The operation control file is stored in the SD memory card 10, and the SD memory card 10 is inserted in the DVC 1. In particular, FIG. 2A illustrates the entire process, FIG. 2B illustrates the process performed when the menu operation control file is selected, and FIG. 2C illustrates the process performed when the button operation control file is selected.

The flow of the entire process shown in FIG. 2A is first described. In step S201, it is determined whether the slot cover 9 is open and whether the SD memory card 10 is inserted into the slot 8. If the SD memory card 10 is inserted into the slot 8, the DVC 1 searches a predetermined directory of the SD memory card 10 to determine whether any operation control file is present in the predetermined directory (step S202).

The directory structure of the SD memory card 10 is a hierarchical structure as shown in FIG. 3, for example, and can be compliant with the Design Rule for Camera File System (DCF).

Pictures taken by the DVC 1 are recorded in a DCF directory "101ABCDE" included in a DCF image root directory "DCIM." In a directory "ABCDEMSC" included in the DCF image root directory "DCIM," there are directories for storing operation control files used to control the DVC 1, which are named, for example, "MENU" and "BUTTON" for the menu operation and button operation, respectively.

In the "MENU" and "BUTTON" directories, operation control files having user-defined control contents for the menu operation and button operation, respectively, are stored. The control contents include, for example, a structure of the menu hierarchy, items (default values) selected on the menu, functions of buttons, etc.

A directory structure for use in the first embodiment is not limited to the above-mentioned directory structure, but can be any structure or directory having user-defined control contents for the menu operation and button operation as long as it is compliant with the DCF. The user-defined control contents for the menu operation and button operation may be stored in separate operation control files or in a single operation control file.

Figure 4:
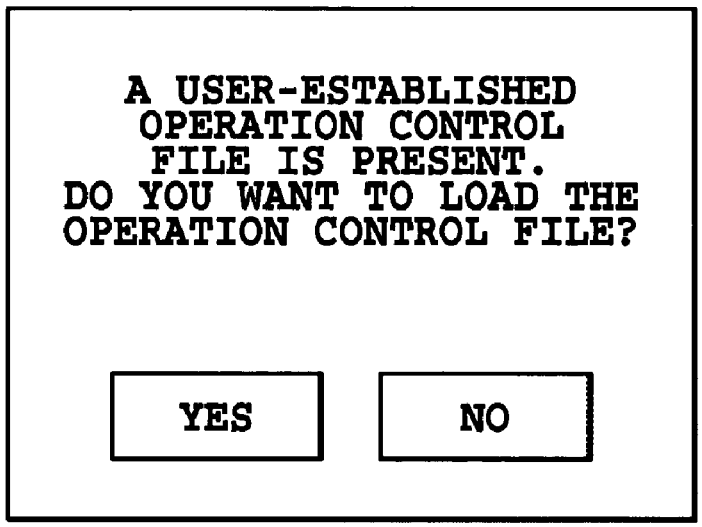
FIG. 4 is a diagram showing an exemplary dialog box for confirming loading of an operation control file.

If it is determined in step S202 that no operation control files are present in the SD memory card 10, the flow comes to an end, and the DVC 1 then continues an ordinary action. If an operation control file is present in the SD memory card 10, the DVC 1 causes the liquid crystal display panel 2 or the electronic viewfinder 3 to display a dialog box querying the user whether or not to load the operation control file (step S203). FIG. 4 is a diagram showing an exemplary dialog box for confirming loading of an operation control file.

Figure 5:
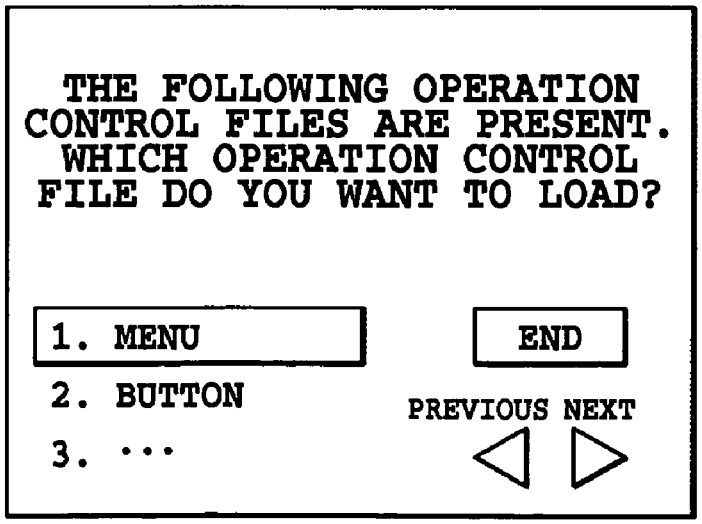
FIG. 5 is a diagram showing an exemplary dialog box for selecting one of operation control files.

If the user selects "NO" via the dial 7, the DVC 1 stops the process of applying the operation control file, thereby bringing the flow to an end. Then, the DVC 1 returns to an ordinary action. If the user selects "YES" via the dial 7, the DVC 1 causes the liquid crystal display panel 2 or the electronic viewfinder 3 to display a list of loadable operation control files for the menu operation, the button operation and other settable operations (step S204). FIG. 5 is a diagram showing an exemplary dialog box for selecting one of operation control files. In the displayed list of loadable operation control files, a selected operation control file is highlighted so as to be more noticeable to the user. Here, the user adjusts a cursor to a desired item via the dial 7 and pushes down the dial 7 to select an operation control file to be loaded.

If a desired item is not displayed, the user can scroll through the list by moving the cursor to "PREVIOUS" or "NEXT" via the dial 7. Then, the user can adjust the cursor to the desired item and select download of the operation control file via the dial 7.

Figure 6:
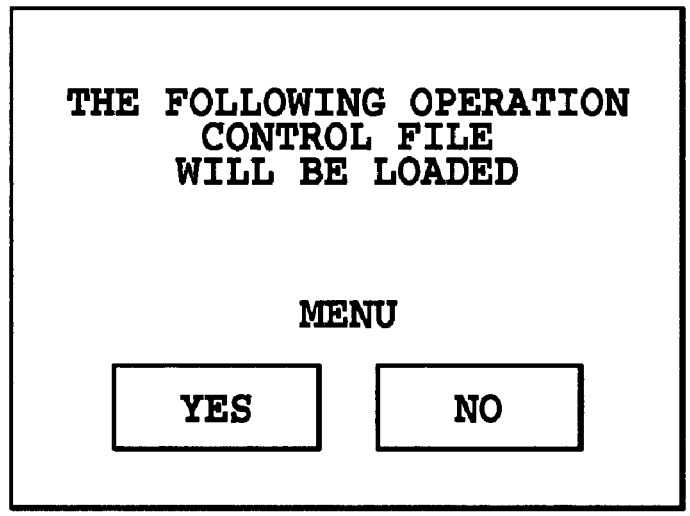
FIG. 6 is a diagram showing an exemplary dialog box for confirming selection of a menu operation control file.

If the user selects "MENU" in step S204, i.e., in the display state shown in FIG. 5, the DVC 1 causes the liquid crystal display panel 2 or the electronic viewfinder 3 to display a confirmation dialog box. FIG. 6 is a diagram showing an exemplary dialog box for confirming selection of a menu operation control file. If the user selects "YES" via the dial 7, the flow proceeds to a menu-deciding process (step S205). If the user selects "NO," the flow returns to the process of displaying the list of loadable operation control files for the menu operation, the button operation and other settable operations, as shown in FIG. 5.

Figure 7:
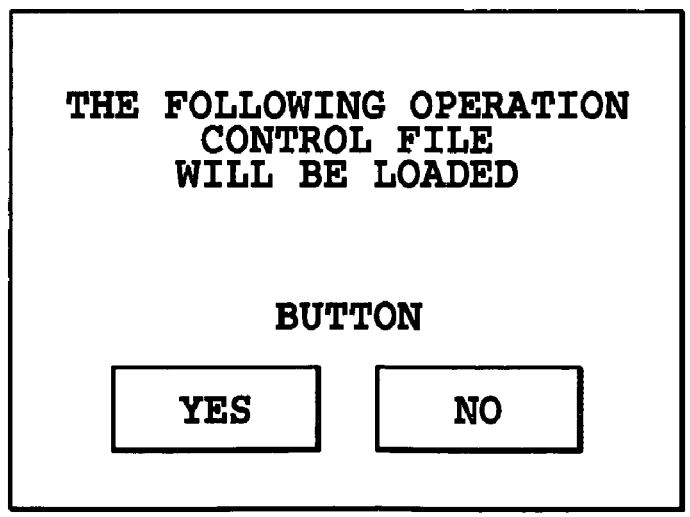
FIG. 7 is a diagram showing an exemplary dialog box for confirming selection of a button operation control file.

Alternatively, if the user selects "BUTTON," in the display state shown in FIG. 5, the DVC 1 causes the liquid crystal display panel 2 or the electronic viewfinder 3 to display a confirmation dialog box as shown in FIG. 7. FIG. 7 is a diagram showing an exemplary dialog box for confirming selection of a button operation control file. If the user selects "YES," the flow proceeds to a button-deciding process (step S206). If the user selects "NO" in the display state shown in FIG. 7, the flow returns to the process of displaying the list of loadable operation control files for the menu operation, the button operation and other settable operations, as shown in FIG. 5.

In addition, if the user selects an item other than "MENU" and "BUTTON," a similar process of deciding an operation control file is performed.

If all the processes of setting operation control files have ended (step S207), the user selects "END" in the dialog box shown in FIG. 5, thereby bringing the operation setting process to an end.

Next, the menu-deciding process (step S205), which is a process performed when the user selects a menu operation control file, is described in detail with reference to FIG. 2B.

Figure 8:
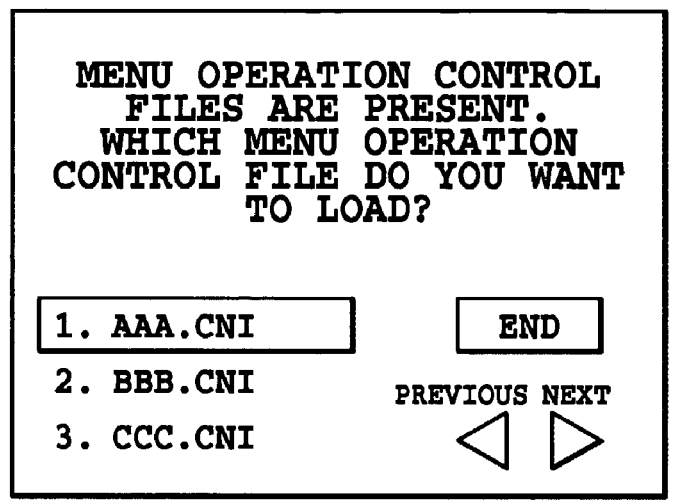
FIG. 8 is a diagram showing an exemplary dialog box for selecting one of menu operation control files.

The DVC 1 reads out, from a predetermined directory of the SD memory card 10, the names of menu operation control files having a user's favorite menu operation control program. The DVC 1 also causes the liquid crystal display panel 2 or the electronic viewfinder 3 to display a list of the names of menu operation control files as shown in FIG. 8 (step S211). FIG. 8 is a diagram showing an exemplary dialog box for selecting one of menu operation control files. Then, the user can select a desired menu operation control file via the dial 7.

If there are a great number of menu operation control files and the complete list cannot be displayed on a single screen, the user can select "PREVIOUS" or "NEXT" via the dial 7 to scroll the names of the previous or next menu operation control files to be displayed on the display screen (step S212 through step S215). Then, the user adjusts the cursor to the desired menu operation control file via the dial 7 and pushes down the dial 7 to select the desired menu operation control file.

Figure 9:
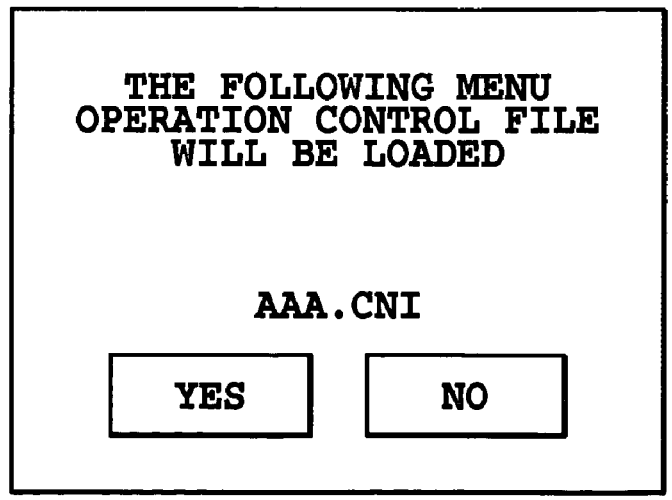
FIG. 9 is a diagram showing an exemplary dialog box for confirming loading of a selected menu operation control file.

If the user has selected a desired menu operation control file (step S216), the DVC 1 causes the liquid crystal display panel 2 or the electronic viewfinder 3 to display a confirmation dialog box as shown in FIG. 9 (step S217). FIG. 9 is a diagram showing an exemplary dialog box for confirming loading of a selected menu operation control file. If the user selects "YES" by the use of the dial 7 in the display state shown in FIG. 9, loading of the desired menu operation control file is decided/confirmed (step S218). The DVC 1 reads the loading-decided menu operation control file from the SD memory card 10 (step S219) and applies the loaded menu operation control file as desired by the user. Then, the flow returns to the process of displaying the list of the names of menu operation control files as shown in FIG. 8. If the user selects "NO" by the use of the dial 7 in the display state shown in FIG. 9, the flow directly returns to the process of displaying the list of the names of menu operation control files as shown in FIG. 8. Here, if the user selects "END" by the use of the dial 7, the flow returns to the process of displaying the list of loadable operation control files for the menu operation, the button operation and other settable operations, as shown in FIG. 5.

Next, the button-deciding process (step S206), which is a process performed when the user selects a button operation control file, is described in detail with reference to FIG. 2C.

Figure 10:
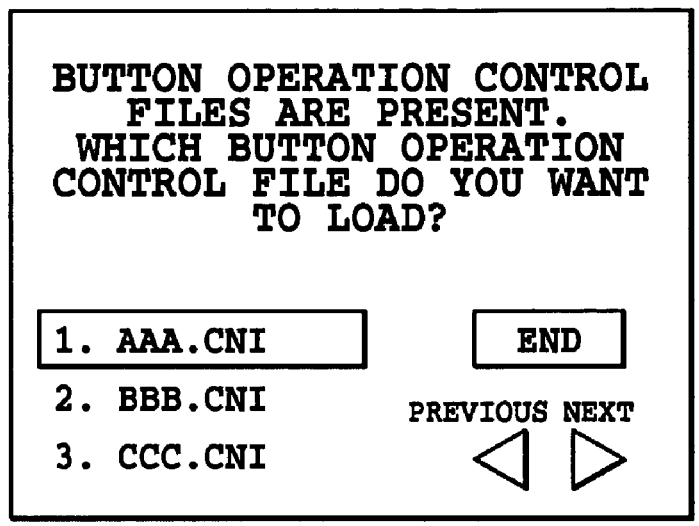
FIG. 10 is a diagram showing an exemplary dialog box for selecting one of button operation control files.

The DVC 1 reads out, from a predetermined directory of the SD memory card 10, the names of button operation control files having a user's favorite button operation control program. The DVC 1 also causes the liquid crystal display panel 2 or the electronic viewfinder 3 to display a list of the names of button operation control files as shown in FIG. 10 (step S221). FIG. 10 is a diagram showing an exemplary dialog box for selecting one of button operation control files. Then, the user adjusts the cursor to a desired button operation control file by the use of the dial 7 and pushes down the dial 7 to select the desired button operation control file.

If a great number of button operation control files are present and a desired button operation control file is not displayed, the user moves the cursor to "PREVIOUS" or "NEXT" by the use of the dial 7 and pushes down the dial 7 to cause the names of the previous or next button operation control files to be displayed (step S222 through step S225). Then, the user adjusts the cursor to the desired button operation control file by the use of the dial 7 and pushes the dial 7 to select the desired button operation control file.

Figure 11:
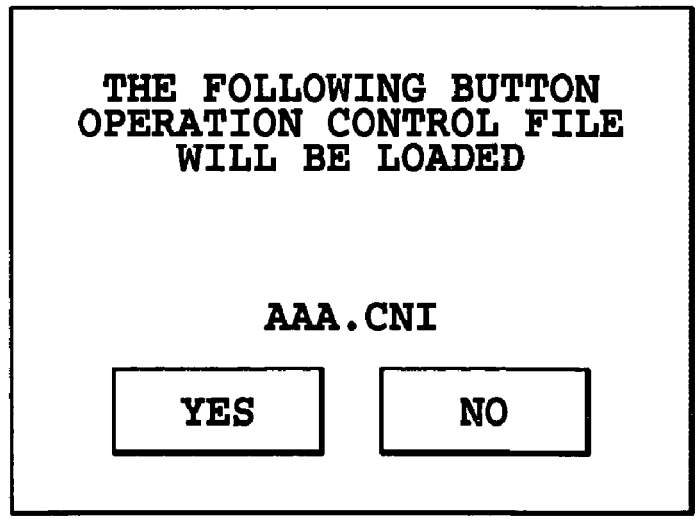
FIG. 11 is a diagram showing an exemplary dialog box for confirming loading of a selected button operation control file.

If the desired button operation control file is decided (step S226), the DVC 1 causes the liquid crystal display panel 2 or the electronic viewfinder 3 to display a confirmation dialog box as shown in FIG. 11 (step S227). FIG. 11 is a diagram showing an exemplary dialog box for confirming loading of a selected button operation control file. If the user selects "YES" by the use of the dial 7 in the display state shown in FIG. 11, loading of the desired button operation control file is decided (step S228). The DVC 1 reads the loading-decided button operation control file from the SD memory card 10 (step S229) and applies the loaded button operation control file as desired by the user. Then, the flow returns to the process of displaying the list of the names of button operation control files as shown in FIG. 10. If the user selects "NO" by the use of the dial 7 in the display state shown in FIG. 11, the flow directly returns to the process of displaying the list of the names of button operation control files as shown in FIG. 10. Here, if the user selects "END" by the use of the dial 7, the flow returns to the process of displaying the list of loadable operation control files for the menu operation, the button operation and other settable operations, as shown in FIG. 5.

If the user selects "END" by the use of the dial 7 in the dialog box shown in FIG. 5, the DVC 1 returns to the ordinary action.

Although the DVC 1 is employed as an image pickup apparatus of the first embodiment, the present invention can be applied to any type of electronic camera with the same advantageous effects.

With the image pickup apparatus configured as described above, the user can easily apply a desired operation control form to the image pickup apparatus by the use of the above-described operation control file, thereby attaining improved operationality with satisfaction.

Second Embodiment

The structural arrangement of an image pickup apparatus according to a second embodiment of the invention is similar to that of the first embodiment shown in FIG. 1. The same or similar functions as those of the first embodiment are omitted from description of the second embodiment. In the image pickup apparatus of the second embodiment, a new function is provided as follows. When the user opens the slot cover 9 for the purpose of removing the SD memory card 10 from the slot 8, the DVC 1 inquires the user whether to save an operation control file in the SD memory card 10. When deciding such saving, the user can save, in the form of the operation control file, the current operation control settings in the SD memory card 10.

In cases where the user has changed the contents of selection of a camera menu during use of the DVC 1, for example, by changing "WHITE BALANCE" of the camera setting in the menu shown in FIG. 12C to "SETTING," if a saving process for the operation control file is applied to the SD memory card 10, such a menu setting that "WHITE BALANCE" is performed by "SETTING" is stored in the operation control file. Then, the operation control file is saved in the SD memory card 10.

Further, in cases where the user has changed the button operation control setting to such an operation that "SEETING OF WHITE BALANCE" is performed by the use of the manual focusing button 4 shown in FIG. 1, if a saving process for the operation control file is applied to the SD memory card 10, such a button setting that "SETTING OF WHITE BALANCE" is performed by the use of the manual focusing button 4 is stored in the operation control file. Then, the operation control file is saved in the SD memory card 10.

Figure 14A:
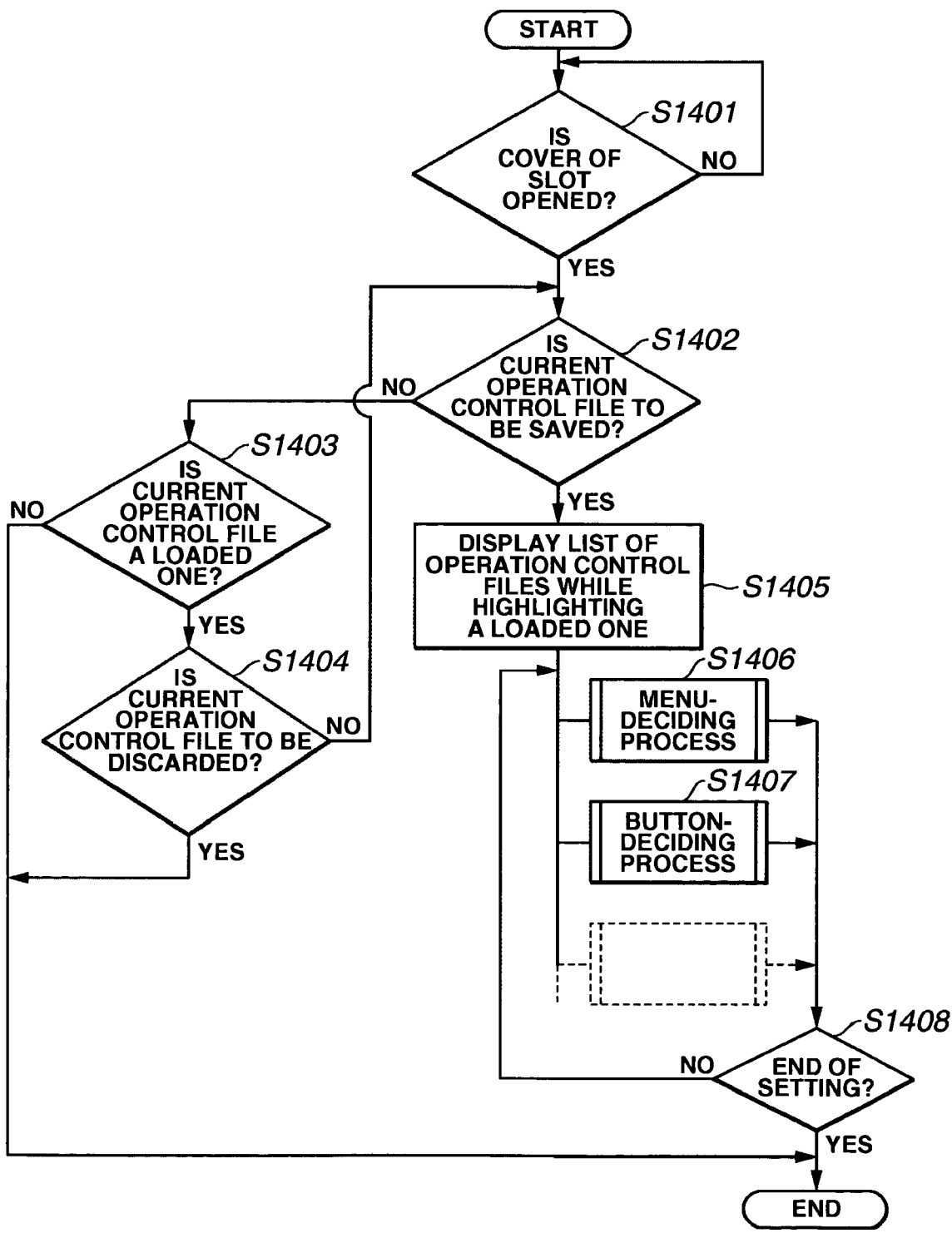
FIG. 14A is a flow chart illustrating an entire process performed when an operation control file is saved.
Figure 14B:
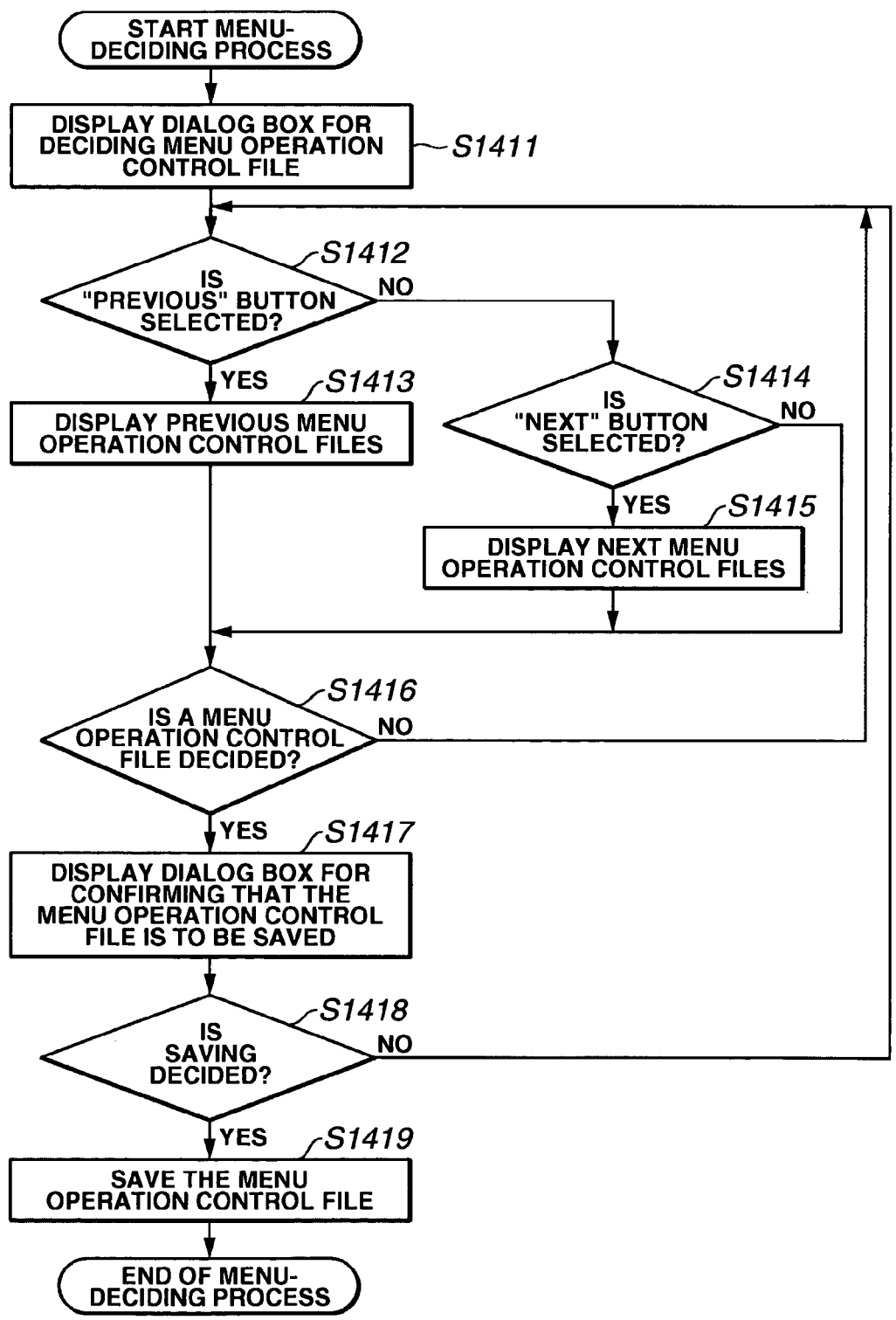
FIG. 14B is a flow chart illustrating a process performed when a menu operation control file is saved.
Figure 14C:
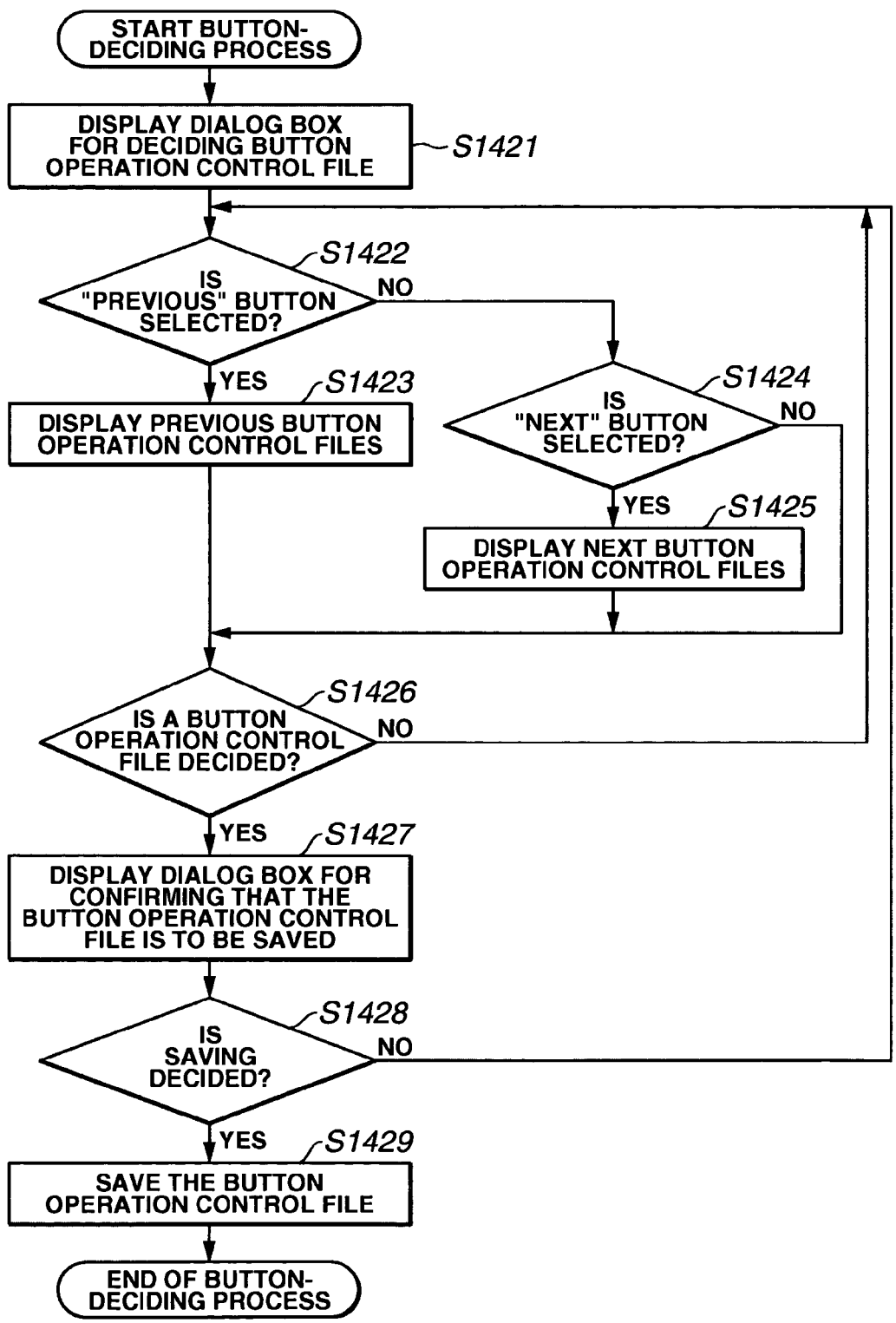
FIG. 14C is a flow chart illustrating a process performed when a button operation control file is saved.

Next, a process of discarding or saving an operation control file in the SD memory card 10 is described. FIGS. 14A, 14B and 14C are flow charts illustrating the process of discarding or saving an operation control file in the SD memory card 10 inserted in the DVC 1. In particular, FIG. 14A illustrates a flow of the entire process, FIG. 14B illustrates a flow of the process performed when the menu operation control file is selected, and FIG. 14C illustrates a flow of the process performed when the button operation control file is selected.

The flow of the entire process shown in FIG. 14A is first described. When detecting that the slot cover 9 of the DVC 1 is opened (step S1401), the DVC 1 searches a predetermined directory of the SD memory card 10 to determine whether any directory having an operation control file is present. The directory structure of the SD memory card 10 is a hierarchical structure compliant with the DCF, as mentioned above with reference to FIG. 3. In directories of the SD memory card 10, operation control files having user-defined control contents for the menu operation, the button operation and other settable operations, respectively, are stored. The control contents include, for example, a structure of the menu hierarchy, items (default values) selected on the menu, functions of buttons, etc.

A directory structure for use in the second embodiment is not limited to the above-mentioned directory structure and may be any structure or directory having user-defined control contents for the menu operation, the button operation and other settable operations, as long as it is compliant with the DCF. The user-defined control contents for the menu operation, the button operation and other settable operations may be stored in separate operation control files or in a single operation control file.

Figure 15:
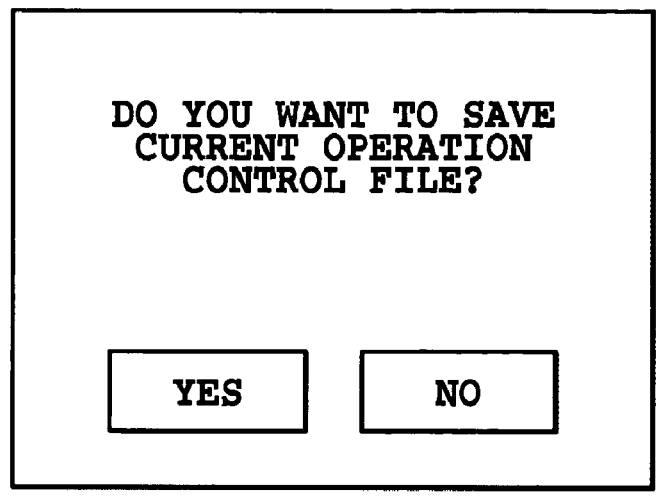
FIG. 15 is a diagram showing an exemplary dialog box for confirming saving of an operation control file.

The DVC 1 causes the liquid crystal display panel 2 or the electronic viewfinder 3 to display a dialog box as shown in FIG. 15 so as to inquire of the user whether to save an operation control file (step S1402). FIG. 15 is a diagram showing an exemplary dialog box for confirming saving of an operation control file. If the user selects "NO" by the use of the dial 7 in the dialog box shown in FIG. 15, the DVC 1 checks to determine if the current operation control setting is based on an operation control file loaded by the user (step S1403). If the operation control file loaded by the user is included in the current operation control setting, the DVC 1 causes the liquid crystal display panel 2 or the electronic viewfinder 3 to display a dialog box as shown in FIG. 23 (step S1404). FIG. 23 is a diagram showing an exemplary dialog box for inquiring about saving of an operation control file. If the user selects "YES" in the dialog box shown in FIG. 23, the DVC 1 stops the process of saving the operation control file, thereby bringing the flow to an end. Then, the DVC 1 returns to an ordinary action. If the user selects "NO" in the dialog box shown in FIG. 23, the flow returns to step S1402.

Figure 16:
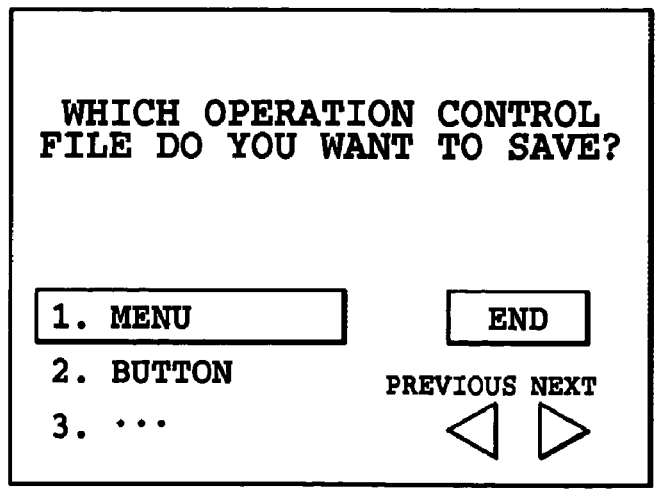
FIG. 16 is a diagram showing an exemplary dialog box for selecting one of operation control files.

In step S1402, if the user selects "YES" by the use of the dial 7 in the dialog box shown in FIG. 15, the DVC 1 causes the liquid crystal display panel 2 or the electronic viewfinder 3 to display a list of operation control files, as shown in FIG. 16, for the menu operation, the button operation and other settable operations (step S1405). FIG. 16 is a diagram showing an exemplary dialog box for selecting one of operation control files. In the list of operation control files as displayed, an indication of the name of the loaded operation control file is highlighted to become noticeable by the user. Here, the user adjusts the cursor to a desired item by the use of the dial 7 and pushes down the dial 7 to decide an operation control file to be saved. If a great number of items are present and a desired item is not displayed in the list, the user moves the cursor to "PREVIOUS" or "NEXT" by the use of the dial 7 and pushes down the dial 7 to cause the desired item to be displayed in the list. Then, the user adjusts the cursor to the desired item by the use of the dial 7 and pushes down the dial 7 to decide an operation control file to be saved.

Figure 17:
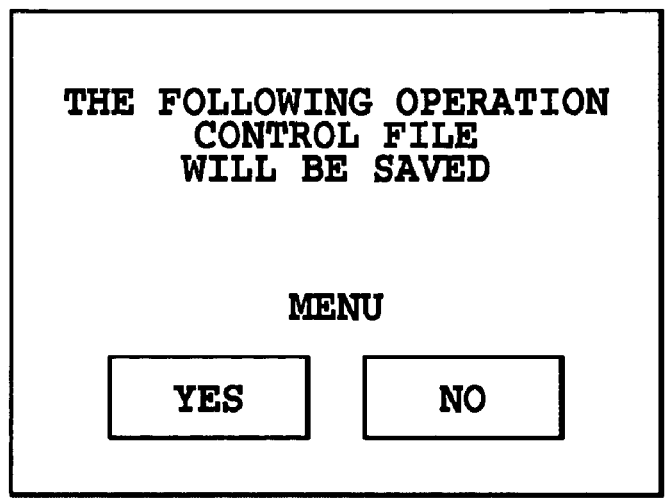
FIG. 17 is a diagram showing an exemplary dialog box for confirming selection of a menu operation control file.

If the user selects, for example, "MENU" by the use of the dial 7 in step S1405, i.e., in the display state shown in FIG. 16, the DVC 1 causes the liquid crystal display panel 2 or the electronic viewfinder 3 to display a confirmation dialog box as shown in FIG. 17. FIG. 17 is a diagram showing an exemplary dialog box for confirming selection of a menu operation control file. If the user selects "YES" by the use of the dial 7, the flow proceeds to a menu-deciding process (step S1406). If the user selects "NO" in the display state shown in FIG. 17, the flow returns to the process of displaying the list of operation control files for the menu operation, the button operation and other settable operations, as shown in FIG. 16.

Figure 18:
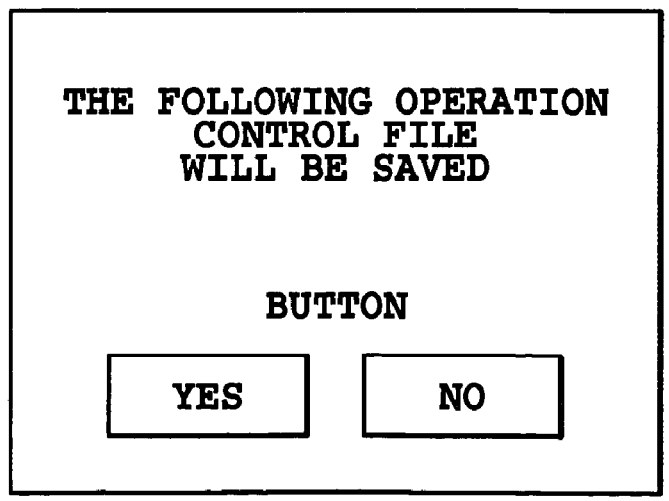
FIG. 18 is a diagram showing an exemplary dialog box for confirming selection of a button operation control file.

Alternatively, if the user selects, for example, "BUTTON" by the use of the dial 7 in the display state shown in FIG. 16, the DVC 1 causes the liquid crystal display panel 2 or the electronic viewfinder 3 to display a confirmation dialog box as shown in FIG. 18. FIG. 18 is a diagram showing an exemplary dialog box for confirming selection of a button operation control file. If the user selects "YES" by the use of the dial 7, the flow proceeds to a button-deciding process (step S1407). If the user selects "NO" in the display state shown in FIG. 18, the flow returns to the process of displaying the list of operation control files for the menu operation, the button operation and other settable operations, as shown in FIG. 16.

In addition, if the user selects an item other than "MENU" and "BUTTON," a similar process of deciding an operation control file is performed.

If all the processes of setting operation control files have ended (step S1408), the user selects "END" in the dialog box shown in FIG. 16, thereby bringing the operation setting process to an end.

Next, the menu-deciding process (step S1406), which is a process performed when the user selects a menu operation control file, is described in detail with reference to FIG. 14B.

Figure 19:
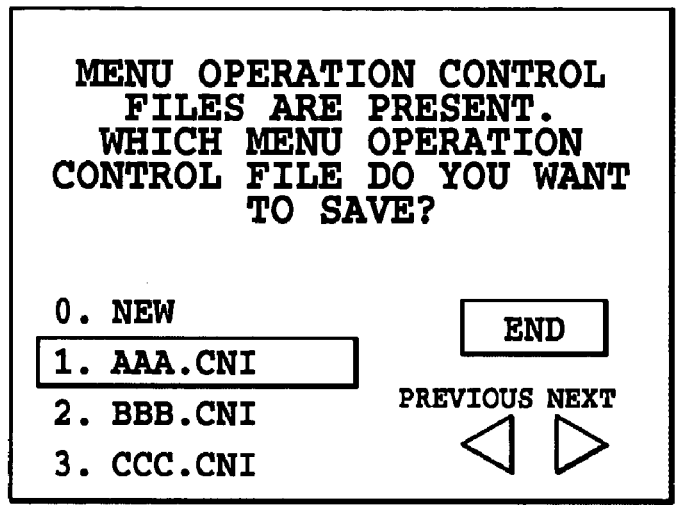
FIG. 19 is a diagram showing an exemplary dialog box for selecting one of menu operation control files.

The DVC 1 reads out, from a predetermined directory of the SD memory card 10, the names of menu operation control files having a user's favorite menu operation control program, and causes the liquid crystal display panel 2 or the electronic viewfinder 3 to display a list of the names of menu operation control files as shown in FIG. 19 (step S1411). FIG. 19 is a diagram showing an exemplary dialog box for selecting one of menu operation control files.

In the display state shown in FIG. 19, the user adjusts the cursor to a desired menu operation control file by the use of the dial 7 and pushes down the dial 7 to select the desired menu operation control file to be saved. If a great number of menu operation control files are present and a desired menu operation control file is not displayed in the list, the user moves the cursor to "PREVIOUS" or "NEXT" by the use of the dial 7 and pushes down the dial 7 to cause the names of the previous or next menu operation control files to be displayed in the list (step S1412 through step S1415). Then, the user adjusts the cursor to the desired menu operation control file by the use of the dial 7 and pushes down the dial 7 to select the desired menu operation control file.

Here, if the menu operation control setting is to be saved in a new menu operation control file, the user selects "0. NEW" in the dialog box shown in FIG. 19. In this case, the new menu operation control file may be arbitrarily named by the user or may be automatically named by the DVC 1 based on date, time, etc.

Figure 20:
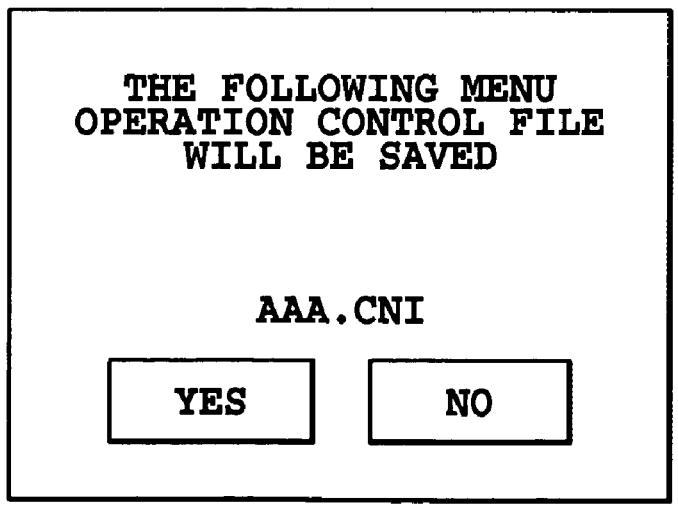
FIG. 20 is a diagram showing an exemplary dialog box for confirming saving of a selected menu operation control file.

If the menu operation control file to be saved is decided (step S1416), the DVC 1 causes the liquid crystal display panel 2 or the electronic viewfinder 3 to display a confirmation dialog box as shown in FIG. 20 (step S1417). FIG. 20 is a diagram showing an exemplary dialog box for confirming saving of a selected menu operation control file. If the user selects "YES" by the use of the dial 7 in the display state shown in FIG. 20, saving of the menu operation control file is decided (step S1418). The DVC 1 writes the current menu operation control setting into the designated menu operation control file (step S1419). Then, the flow returns to the process of displaying the list of the names of menu operation control files as shown in FIG. 19. If the user selects "NO" by the use of the dial 7 in the display state shown in FIG. 20, the flow directly returns to the process of displaying the list of the names of menu operation control files as shown in FIG. 19. Here, if the user selects "END" by the use of the dial 7, the flow returns to the process of displaying the list of operation control files for the menu operation, the button operation and other settable operations, as shown in FIG. 16.

Next, the button-deciding process (step S1407), which is a process performed when the user selects a button operation control file, is described in detail with reference to FIG. 14C.

Figure 21:
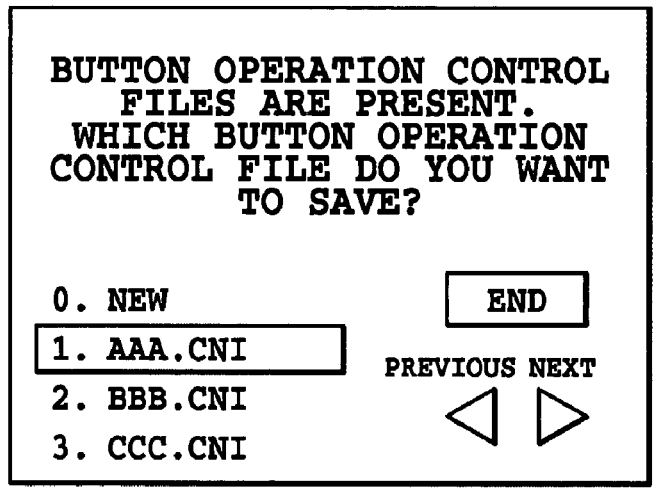
FIG. 21 is a diagram showing an exemplary dialog box for selecting one of button operation control files.

The DVC 1 reads out, from a predetermined directory of the SD memory card 10, the names of button operation control files having a user's favorite button operation control program, and causes the liquid crystal display panel 2 or the electronic viewfinder 3 to display a list of the names of button operation control files as shown in FIG. 21 (step S1421). FIG. 21 is a diagram showing an exemplary dialog box for selecting one of button operation control files.

In the display state shown in FIG. 21, the user adjusts the cursor to a desired button operation control file by the use of the dial 7 and pushes down the dial 7 to select the desired button operation control file to be saved. If a great number of button operation control files are present and a desired button operation control file is not displayed in the list, the user moves the cursor to "PREVIOUS" or "NEXT" by the use of the dial 7 and pushes down the dial 7 to cause the names of the previous or next button operation control files to be displayed in the list (step S1422 through step S1425). Then, the user adjusts the cursor to the desired button operation control file by the use of the dial 7 and pushes down the dial 7 to select the desired button operation control file.

Here, if the button operation control setting is to be saved in a new button operation control file, the user selects "0. NEW" in the dialog box shown in FIG. 21. In this case, the new button operation control file may be arbitrarily named by the user or may be automatically named by the DVC 1 based on date, time, etc.

Figure 22:
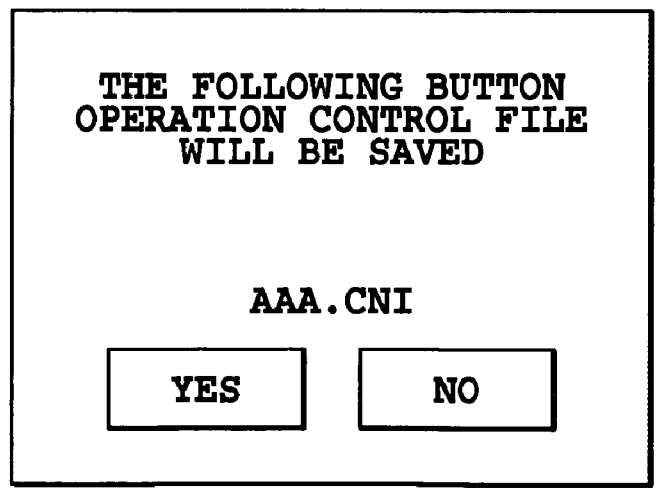
FIG. 22 is a diagram showing an exemplary dialog box for confirming saving of a selected button operation control file.

If the button operation control file to be saved is decided (step S1426), the DVC 1 causes the liquid crystal display panel 2 or the electronic viewfinder 3 to display a confirmation dialog box as shown in FIG. 22 (step S1427). FIG. 22 is a diagram showing an exemplary dialog box for confirming saving of a selected button operation control file. If the user selects "YES" by the use of the dial 7 in the display state shown in FIG. 22, saving of the button operation control file is decided (step S1428). The DVC 1 writes the current button operation control setting into the designated button operation control file (step S1429). Then, the flow returns to the process of displaying the list of the names of button operation control files as shown in FIG. 21. If the user selects "NO" by the use of the dial 7 in the display state shown in FIG. 22, the flow directly returns to the process of displaying the list of the names of menu operation control files as shown in FIG. 21. Here, if the user selects "END" by the use of the dial 7, the flow returns to the process of displaying the list of operation control files for the menu operation, the button operation and other settable operations, as shown in FIG. 16.

With the image pickup apparatus configured as described above, the user can easily extract and save a desired operation control setting from or in the image pickup apparatus by the use of the above-described operation control file, thereby attaining improved operationality with satisfaction.

Although the DVC 1 is employed as an image pickup apparatus of the second embodiment, the present invention can be applied to any type of electronic camera with the same advantageous effects.

Third Embodiment

The internal arrangement of an image pickup apparatus (DVC) employed in each of the first and second embodiments is described below as a third embodiment of the invention.

Figure 24:
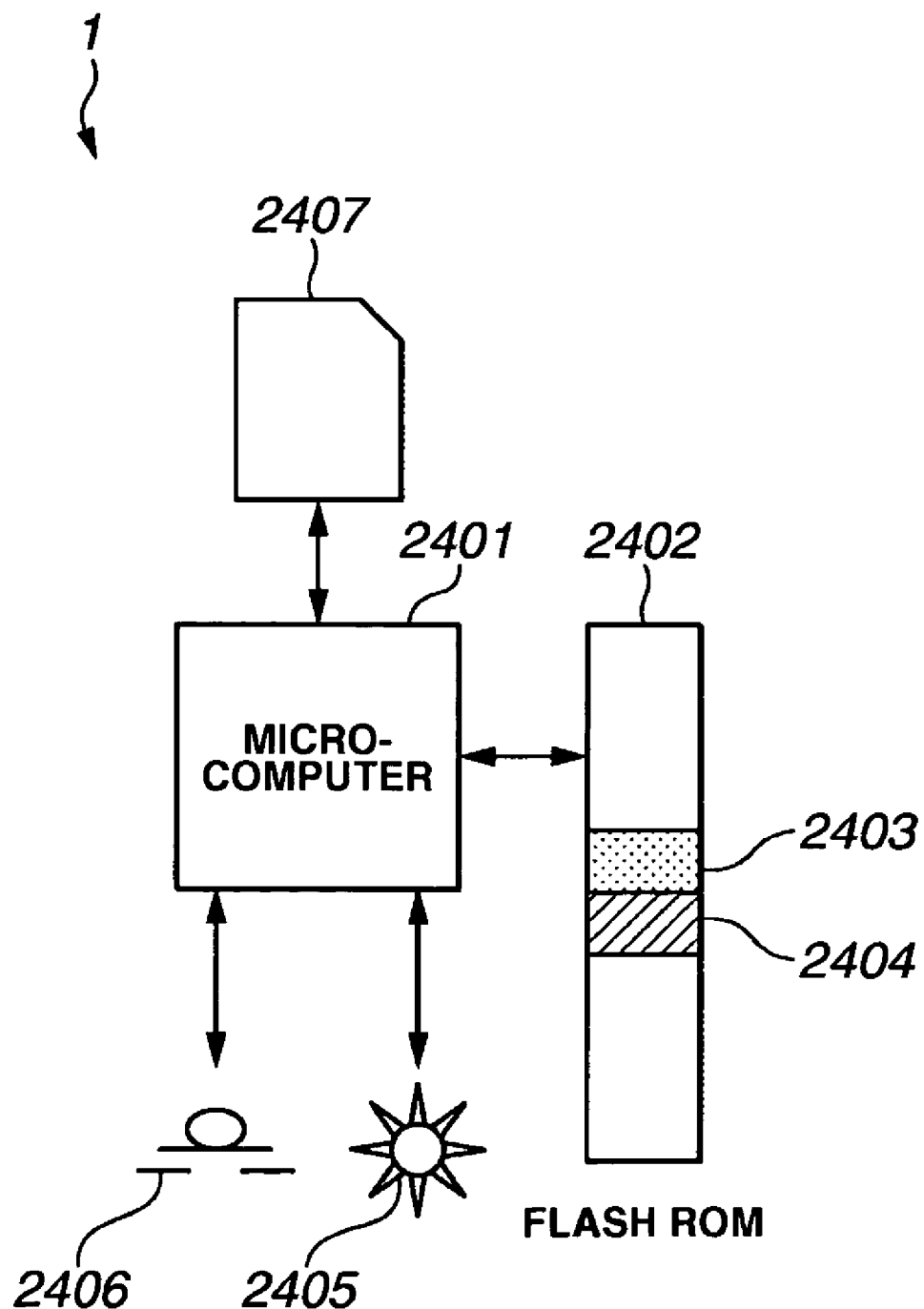
FIG. 24 is a block diagram showing an exemplary internal structure of an image pickup apparatus according to an embodiment of the invention in which a single microcomputer is disposed.

FIG. 24 shows the internal arrangement of the DVC 1 shown in FIG. 1 in an example in which a system controller for controlling the whole apparatus and the processes illustrated by the above-described flow charts is composed of a single microcomputer 2401. In FIG. 24, in cases where an operation control file read out from an SD memory card 2407 (corresponding to the SD memory card 10 shown in FIG. 1) mounted in the DVC 1 is applied to the DVC 1, or in cases where an operation control setting of the DVC 1 is written, as an operation control file, into the SD memory card 2407, the DVC 1 is controlled by the microcomputer 2401. A flash ROM 2402, which is a rewritable memory for storing programs, is connected to the microcomputer 2401. The flash ROM 2402 contains a memory area 2403 in which control data concerning standard key operations are written and a memory area 2404 that is adapted to allow the user to arbitrarily write therein control data concerning key operations.

A key input signal line from a dial 2405 (corresponding to the rotary dial 7 shown in FIG. 1) operable for selecting hierarchical menu items and for deciding settings is connected to the microcomputer 2401. Also, a key input signal line from a hardware button 2406 (corresponding to the hardware button 4 shown in FIG. 1) operable for setting a particular picture-taking condition, such as manual focusing, is connected to the microcomputer 2401.

When the user mounts the SD memory card 2407 in the DVC 1, in which the card 2407 stores an operation control file having user's favorite picture-taking operation control settings in a predetermined directory, the microcomputer 2401 searches the predetermined directory of the SD memory card 2407 to determine whether the operation control file is present in the predetermined directory. Then, the microcomputer 2401 inquires the user whether to apply the operation control file stored in the SD memory card 2407. This sequence is the same as previously described in the first embodiment. When the user gives the microcomputer 2401 instructions to read the operation control file through the steps described in the first embodiment, the microcomputer 2401 reads the operation control file and writes in the memory area 2404 a key table for enabling an operation control setting desired by the user to be realized.

When the user performs the desired setting operation by the use of the dial 2405 or the hardware button 2406, the microcomputer 2401 changes a reference key table from that stored in the memory area 2403 to that written in the memory area 2404, so as to cause the key operation setting designated by the user to be performed in place of a standard key operation control setting. Thus, by changing over the reference key table, the microcomputer 2401 can realize the operation control setting desired by the user.

When the user opens the slot cover 9 shown in FIG. 1 for the purpose of removing the SD memory card 2407, the microcomputer 2401 searches a predetermined directory of the SD memory card 2407 to determine whether an operation control file is present in the predetermined directory. Then, the microcomputer 2401 inquires the user whether to save the operation control file in the SD memory card 2407. This sequence is the same as previously described in the second embodiment. When the user gives the microcomputer 2401 instructions to save the operation control file through the steps described in the second embodiment, the microcomputer 2401 reads the corresponding key table from a memory area (for example, the memory area 2404) of the flash ROM 2402 and writes the read key table as the operation control file in the predetermined directory of the SD memory card 2407.

Thus, by storing the designated key table as an operation control file, the microcomputer 2401 can save, in an external storage, an operation control file having operation control settings desired by the user.

Figure 25:
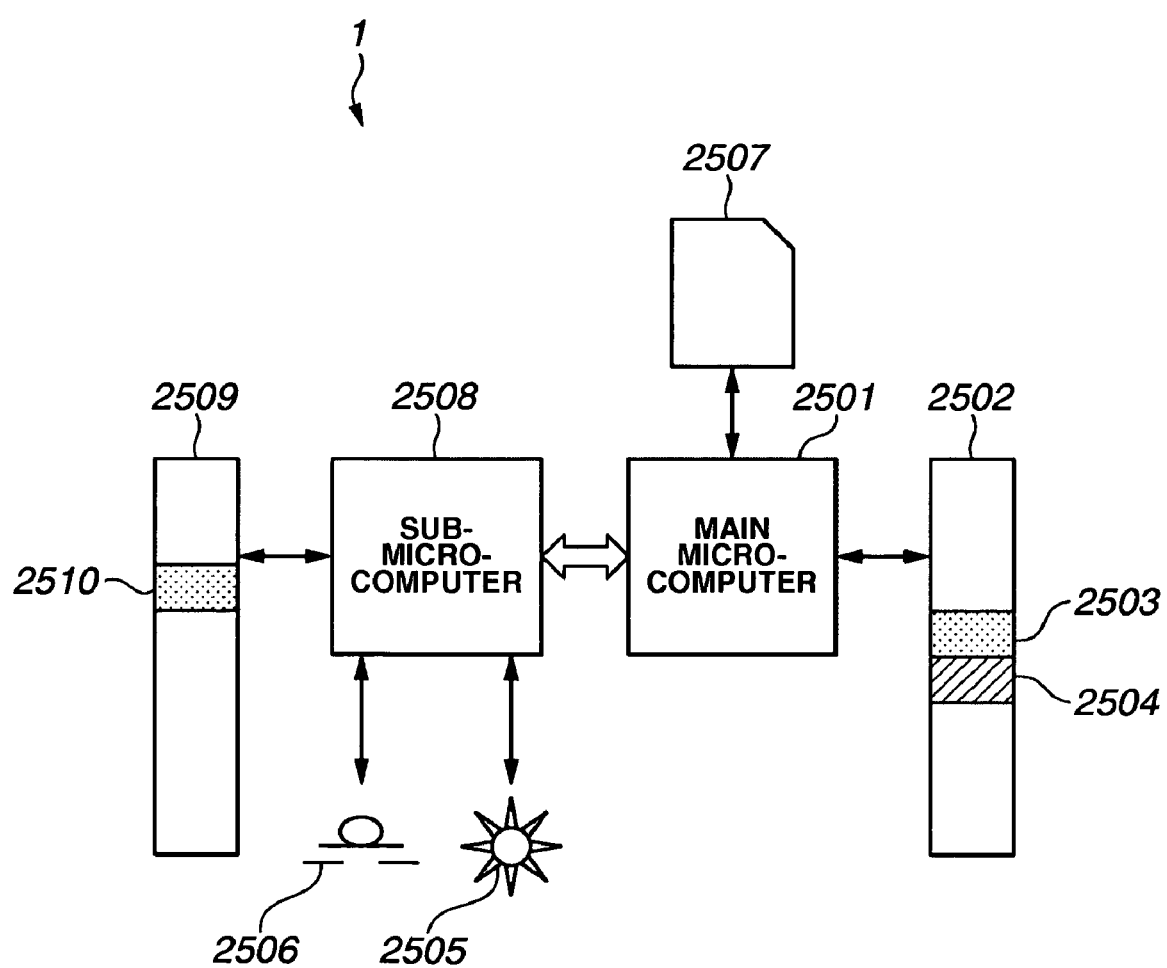
FIG. 25 is a block diagram showing another exemplary internal structure of an image pickup apparatus according to an embodiment of the invention in which two microcomputers are disposed.

Next, FIG. 25 shows the internal arrangement of the DVC 1 shown in FIG. 1 in an example in which a system controller for controlling the whole apparatus and the processes illustrated by the above-described flow charts is composed of two microcomputers 2501 and 2508. In FIG. 25, in cases where an operation control file read out from an SD memory card 2507 (corresponding to the SD memory card 10 shown in FIG. 1) mounted in the DVC 1 is applied to the DVC 1, or in cases where an operation control setting of the DVC 1 is written, as an operation control file, into the SD memory card 2507, the DVC 1 is controlled by the main microcomputer 2501 and the sub-microcomputer 2508.

A flash ROM 2502, which is a rewritable memory for storing programs, is connected to the main microcomputer 2501. The flash ROM 2502 contains a memory area 2503 in which control data concerning standard key operations are written and a memory area 2504 that is adapted to allow the user to arbitrarily write therein control data concerning key operations.

A flash ROM 2509, which is a rewritable memory for storing programs, is connected to the sub-microcomputer 2508. The flash ROM 2509 contains a memory area 2510 in which standard key operation control settings are written. A key input signal line from a dial 2505 (corresponding to the rotary dial 7 shown in FIG. 1) operable for selecting hierarchical menu items and for deciding settings is connected to the sub-microcomputer 2508. Also, a key input signal line from a hardware button 2506 (corresponding to the hardware button 4 shown in FIG. 1) operable for setting a particular picture-taking condition, such as manual focusing, is connected to the sub-microcomputer 2508.

When the user mounts in the DVC 1 the SD memory card 2507, in which an operation control file having user's favorite picture-taking operation control settings is stored in a predetermined directory, the main microcomputer 2501 searches the predetermined directory of the SD memory card 2507 to determine whether the operation control file is present in the predetermined directory. Then, the main microcomputer 2501 inquires the user whether to apply the operation control file stored in the SD memory card 2507. This sequence is the same as previously described in the first embodiment. When the user gives the main microcomputer 2501 instructions to read the operation control file through the steps described in the first embodiment, the main microcomputer 2501 reads the operation control file and writes in the memory area 2504 a key table for enabling an operation control setting desired by the user to be realized.

When the user performs the desired setting operation by the use of the dial 2505 or the hardware button 2506, the sub-microcomputer 2508 transmits to the main microcomputer 2501 key instructions with a key table that is not yet changed by the user. The main microcomputer 2501 changes a reference key table from that stored in the memory area 2503 to that written in the memory area 2504, so as to cause the key operation setting designated by the user to be performed in place of a standard key operation control setting.

Thus, by changing over the reference key table on the side of the main microcomputer 2501, the main microcomputer 2501 and the sub-microcomputer 2508 can realize the operation control setting desired by the user.

When the user opens the slot cover 9 shown in FIG. 1 for the purpose of removing the SD memory card 2507, the main microcomputer 2501 searches a predetermined directory of the SD memory card 2507 to determine whether an operation control file is present in the predetermined directory. Then, the main microcomputer 2501 inquires the user whether to save the operation control file in the SD memory card 2507. This sequence is the same as previously described in the second embodiment. When the user gives the main microcomputer 2501 instructions to save the operation control file through the steps described in the second embodiment, the main microcomputer 2501 reads the corresponding key table from a memory area (for example, the memory area 2504) of the flash ROM 2502 and writes the read key table as the operation control file in the predetermined directory of the SD memory card 2507.

Thus, by storing the designated key table as an operation control file, the main microcomputer 2501 and the sub-microcomputer 2508 can save, in an external storage, an operation control file having operation control settings desired by the user.

Figure 26:
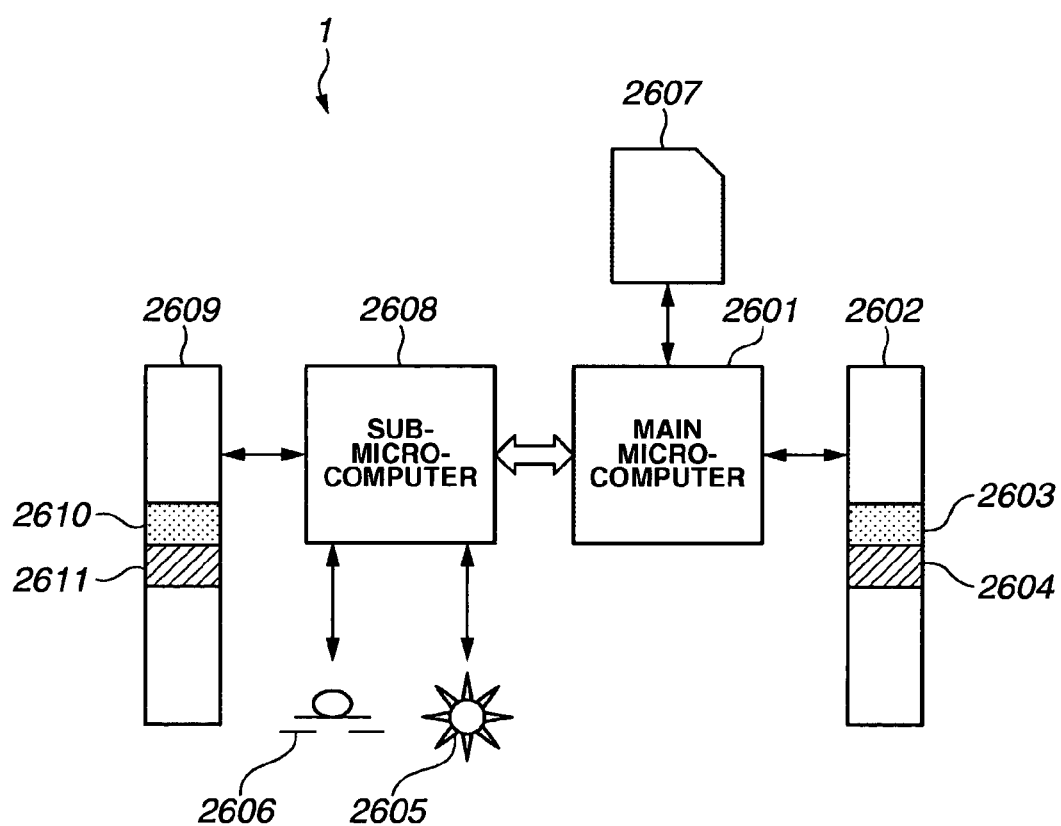
FIG. 26 is a block diagram showing a further exemplary internal structure of an image pickup apparatus according to an embodiment of the invention in which two microcomputers are disposed.

Next, FIG. 26 shows the internal arrangement of the DVC 1 shown in FIG. 1 in another example in which a system controller for controlling the whole apparatus and the processes illustrated by the above-described flow charts is composed of two microcomputers 2601 and 2608. In FIG. 26, in cases where an operation control file read out from an SD memory card 2607 (corresponding to the SD memory card 10 shown in FIG. 1) mounted in the DVC 1 is applied to the DVC 1, or in cases where an operation control setting of the DVC 1 is written, as an operation control file, into the SD memory card 2607, the DVC 1 is controlled by the main microcomputer 2601 and the sub-microcomputer 2608.

A flash ROM 2602, which is a rewritable memory for storing programs, is connected to the main microcomputer 2601. The flash ROM 2602 contains a memory area 2603 in which control data concerning standard key operations are written and a memory area 2604 that is adapted to allow the user to arbitrarily write therein control data concerning key operations.

A flash ROM 2609, which is a rewritable memory for storing programs, is connected to the sub-microcomputer 2608. The flash ROM 2609 contains a memory area 2610 in which standard key operation control settings are written and a memory area 2611 that is adapted to allow the user to arbitrarily write therein key operation control settings. A key input signal line from a dial 2605 (corresponding to the rotary dial 7 shown in FIG. 1) operable for selecting hierarchical menu items and for deciding settings is connected to the sub-microcomputer 2608. Also, a key input signal line from a hardware button 2606 (corresponding to the hardware button 4 shown in FIG. 1) operable for setting a particular picture-taking condition, such as manual focusing, is connected to the sub-microcomputer 2608.

When the user mounts in the DVC 1 the SD memory card 2607, in which an operation control file having user's favorite picture-taking operation control settings is stored in a predetermined directory, the main microcomputer 2601 searches the predetermined directory of the SD memory card 2607 to determine whether the operation control file is present in the predetermined directory. Then, the main microcomputer 2601 inquires the user whether to apply the operation control file stored in the SD memory card 2607. This sequence is the same as previously described in the first embodiment. When the user gives the main microcomputer 2601 instructions to read the operation control file through the steps described in the first embodiment, the main microcomputer 2601 reads the operation control file and writes in the memory area 2604 a key table for enabling an operation control setting desired by the user to be realized.

Further, the main microcomputer 2601 reads the operation control file and instructs the sub-microcomputer 2608 to write in the memory area 2611 a key table for enabling the operation control setting desired by the user to be realized. In response to these instructions, the sub-microcomputer 2608 writes in the memory area 2611 the key table for the sub-microcomputer 2608 that is transmitted via the main microcomputer 2601.

When the user performs the desired setting operation by the use of the dial 2605 or the hardware button 2606, the sub-microcomputer 2608 changes a reference key table from that stored in the memory area 2610 to that written in the memory area 2611, so as to cause the key operation setting designated by the user to be performed in place of a standard key operation control setting. Then, the sub-microcomputer 2608 transmits to the main microcomputer 2601 key instructions associated with the new key table. The main microcomputer 2601 performs the key operation setting designated by the user in accordance with the key instructions associated with the new key table in place of the standard key operation setting.

Thus, by changing over the key table to which the sub-microcomputer 2608 makes reference, the main microcomputer 2601 can realize the operation control setting desired by the user.

When the user opens the slot cover 9 shown in FIG. 1 for the purpose of removing the SD memory card 2607, the main microcomputer 2601 searches a predetermined directory of the SD memory card 2607 to determine whether an operation control file is present in the predetermined directory. Then, the main microcomputer 2501 inquires the user whether to save the operation control file in the SD memory card 2607. This sequence is the same as previously described in the second embodiment. When the user gives the main microcomputer 2601 instructions to save the operation control file through the steps described in the second embodiment, the main microcomputer 2601 reads the corresponding key table from a memory area (for example, the memory area 2604) of the flash ROM 2602 and writes the read key table as the operation control file in the predetermined directory of the SD memory card 2607.

Further, the main microcomputer 2601 instructs the sub-microcomputer 2608 to read from the memory area 2611 a key table for enabling an operation control setting desired by the user to be realized. In response to these instructions, the sub-microcomputer 2608 writes in a predetermined directory of the SD memory card 2607 the key table for the sub-microcomputer 2608 via the main microcomputer 2601.

Thus, by storing the designated key table as an operation control file, the main microcomputer 2601 and the sub-microcomputer 2608 can save, in an external storage, an operation control file having operation control settings desired by the user.

Although the above embodiments have been described with key operations taken as an example of a target for operation control, the target for operation control may include any kinds of setting items of the DVC 1, for example, default selections.

Although, in the above embodiments, mounting and removing the SD memory card 2407, 2507 or 2607 necessarily result in the microcomputer 2401, 2501 or 2601 inquiring the user the searching and setting of an operation control file, the setting of an operation control file may be selectively performed if it is troublesome.

Moreover, an operation control file for use in the present invention may be stored in the comma-deliminated CSV format, the INI file format, the ASCII format, etc., and, therefore, can be easily edited through the use of a text editor on a personal computer or a dedicated operation-control-setting application program.

Other Embodiments

Note that the present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage medium that can be used for supplying the program include, but are not limited to, a floppy disk, a hard disk, an optical disk, a magneto-optical disk, a CD-ROM, a CD-R, a CD-RW, a magnetic tape, a non-volatile type memory card, a ROM, a Blu-ray Disc, and a DVD (a DVD-ROM, a DVD-R, a DVD-RW and a DVD-RAM).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit may perform all or a part of the actual processing so that the functions of the foregoing embodiments can be implemented by this processing.

What is claimed is:

1. An image pickup apparatus using a removable recording medium, the image pickup apparatus comprising:
   an operation button operable to set a picture-taking condition;
   a recorder operable to record, on the removable recording medium, an operation control file to produce a changed configuration of the operation button in cases where a user has changed the configuration of the operation button;
   a reader operable to detect and read the operation control file stored on the removable recording medium; and
   a controller selectively controlling the reader and the recorder.

2. An image pickup apparatus according to claim 1, wherein the controller controls the reader to detect and read the operation control file stored on the removable recording medium and applying the read operation control file on the operation button.

3. An image pickup apparatus according to claim 2, wherein the controller includes a microcomputer and a rewritable memory, and wherein the microcomputer receives the read operation control file from the reader and stores in the rewritable memory a key table corresponding to the read operation control file.

4. An image pickup apparatus according to claim 2, wherein responsive to the controller applying the read operation control file on the operation button, the controller configures the operation button operable to set a picture-taking condition corresponding to the read operation control file.

5. An image pickup apparatus according to claim 1, wherein the controller selectively controls the recorder to record on the removable recording medium the operation control file corresponding to the configuration of the operation button.

6. An image pickup apparatus using a removable recording medium, the image pickup apparatus comprising:

a display operable to display a menu of picture-taking condition settings;

an operation button operable to set a picture-taking condition;

a recorder operable to record, on the removable recording medium, an operation control file to produce a changed hierarchy of a menu item or a changed configuration of the operation button in cases where a user has changed at least one of the hierarchy of the menu item included in the menu of picture-taking condition settings and the configuration of the operation button;

a reader operable to detect and read the operation control file stored on the removable recording medium; and a controller selectively controlling the reader and the recorder, wherein the recorder includes a cover having an open state and a closed state, and wherein responsive to the cover being in the open state, the controller selectively controls the recorder to record the operation control file on the removable recording medium.

* * * * *